(12) United States Patent
Yamaguchi et al.

(10) Patent No.: US 11,098,769 B2
(45) Date of Patent: Aug. 24, 2021

(54) CLUTCH MECHANISM AND PISTON

(71) Applicant: HONDA MOTOR CO., LTD., Tokyo (JP)

(72) Inventors: Nobutaka Yamaguchi, Wako (JP); Kenji Niwata, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 161 days.

(21) Appl. No.: 16/232,256

(22) Filed: Dec. 26, 2018

(65) Prior Publication Data

US 2019/0242443 A1 Aug. 8, 2019

(30) Foreign Application Priority Data

Feb. 6, 2018 (JP) .............................. JP2018-019572

(51) Int. Cl.
| | | |
|---|---|---|
| *F16D 25/0638* | (2006.01) | |
| *F16D 25/08* | (2006.01) | |
| *F15B 15/14* | (2006.01) | |
| *F16D 48/02* | (2006.01) | |

(52) U.S. Cl.
CPC ........ *F16D 25/083* (2013.01); *F15B 15/1447* (2013.01); *F16D 2048/0212* (2013.01)

(58) Field of Classification Search
None
See application file for complete search history.

(56) References Cited

U.S. PATENT DOCUMENTS

| | | | | |
|---|---|---|---|---|
| 4,442,929 | A * | 4/1984 | Uchida | .................... F16D 25/14 |
| | | | | 188/366 |
| 4,924,978 | A * | 5/1990 | Ohkubo | .................. F16H 45/02 |
| | | | | 192/106 F |
| 6,112,874 | A | 9/2000 | Kopp et al. | |
| 9,121,459 | B2 | 9/2015 | Niwata | |
| 2004/0065521 | A1* | 4/2004 | Watanabe | ........... F16D 25/0638 |
| | | | | 192/70.14 |
| 2014/0262676 | A1* | 9/2014 | Niwata | .................... F16D 25/12 |
| | | | | 192/85.24 |
| 2016/0131200 | A1* | 5/2016 | Kim | ........................ F16D 13/52 |
| | | | | 192/48.1 |
| 2018/0202500 | A1* | 7/2018 | Murakami | ............... F16D 25/14 |

FOREIGN PATENT DOCUMENTS

| | | | |
|---|---|---|---|
| JP | 2000-320573 A | 11/2000 | |
| JP | 2014-177980 A | 9/2014 | |
| JP | 2015-190472 A | 11/2015 | |
| JP | 2017-106578 A | 6/2017 | |

OTHER PUBLICATIONS

Japanese Office Action (w/ partial translation) issued for Japanese Patent Application No. 2018-019572 dated Aug. 2, 2019.

* cited by examiner

*Primary Examiner* — Charles A Fox
*Assistant Examiner* — Ryan P Dodd
(74) *Attorney, Agent, or Firm* — Thomas | Horstemeyer, LLP

(57) ABSTRACT

A clutch mechanism switches a clutch to one of an engaging state and a released state by a piston operated by an oil pressure. The piston includes a first side surface portion configured to press the clutch, and a second side surface portion on which the oil pressure acts. The second side surface portion has an uneven shape in a circumferential direction.

8 Claims, 3 Drawing Sheets

← : FLOW OF OIL

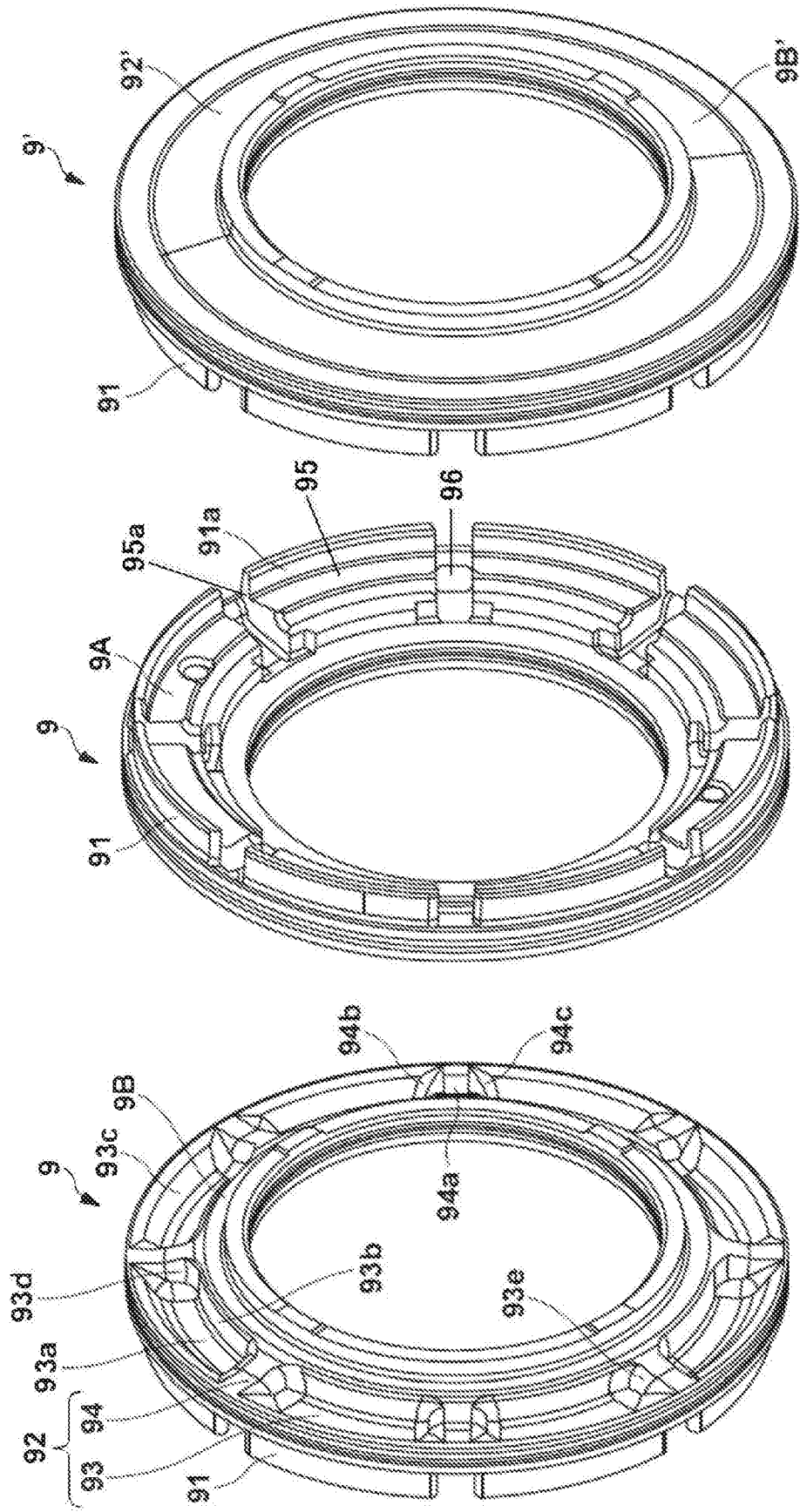

ONLY CASE

PISTON ASSEMBLED STATE

CLUTCH MECHANISM AND PISTON

CROSS-REFERENCE TO RELATED APPLICATION(S)

This application claims priority to and the benefit of Japanese Patent Application No. 2018-019572, filed Feb. 6, 2018, the entire disclosure of which is incorporated herein by reference.

BACKGROUND OF THE INVENTION

Field of the Invention

The present invention relates to a piston and a clutch mechanism which are operated by an oil pressure.

Description of the Related Art

A clutch mechanism formed by a wet multiple disc clutch and the like includes a plurality of discs and a plurality of plates, which are alternately arranged, and engages them with each other by the pressing force of a piston, thereby transmitting a rotational force. The piston is operated by an oil pressure applied to a piston chamber and switches the discs and the plates between an engaging state and a released state (Japanese Patent Laid-Open Nos. 2000-320573 and 2017-106578).

Hydraulic oil is sucked from an oil pan via a strainer, and a predetermined oil pressure is applied to the piston chamber by a solenoid valve. At this time, if a few bubbles are mixed when sucking the hydraulic oil from the strainer, the bubbles may stay in the piston chamber and exert an influence on the hydraulic responsiveness of the piston.

SUMMARY OF THE INVENTION

The present invention has been made in consideration of the aforementioned problems, and realizes a clutch mechanism and a piston capable of preventing bubbles from staying in a piston chamber.

In order to solve the aforementioned problems, the first aspect of the present invention provides a clutch mechanism configured to switch a clutch to one of an engaging state and a released state by a piston operated by an oil pressure, wherein the piston includes a first side surface portion configured to press the clutch, and a second side surface portion on which the oil pressure acts, and the second side surface portion has an uneven shape in a circumferential direction.

In order to solve the aforementioned problems, the second aspect of the present invention provides a piston operated by an oil pressure and configured to switch a clutch of a clutch mechanism to one of an engaging state and a released state, wherein the piston includes a first side surface portion configured to press the clutch, and a second side surface portion on which the oil pressure acts, and the second side surface portion has an uneven shape in a circumferential direction.

According to the present invention, it is possible to realize a structure capable of preventing bubbles from staying in a piston chamber.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 2A and 2B are views showing the outer appearance of the piston in the clutch mechanism according to the embodiment;

FIG. 2C is a view showing the outer appearance of a conventional piston;

DESCRIPTION OF THE EMBODIMENT

An embodiment of the present invention will now be described with reference to the accompanying drawings.

Overall Structure

The overall structure of a clutch mechanism 1 including a piston 9 according to this embodiment will be described first with reference to FIG. 1.

Figure 1:
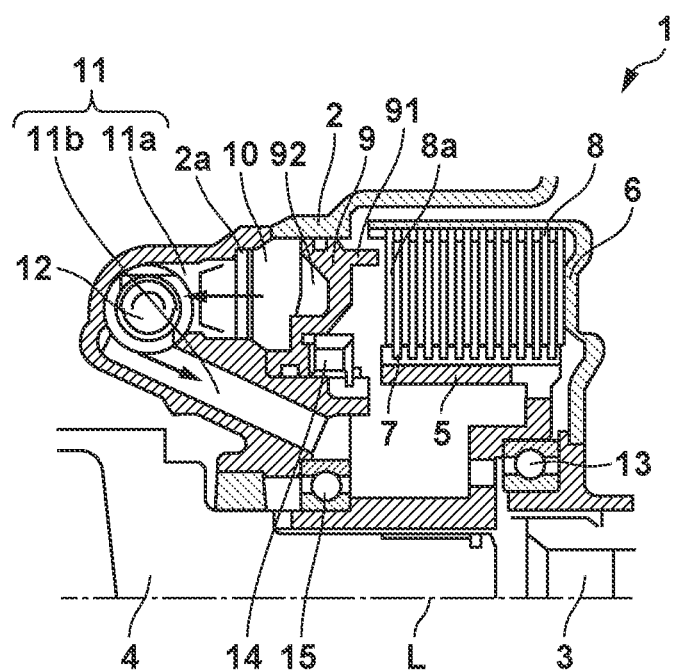
FIG. 1 is a sectional view showing a structure on the periphery of a piston in a clutch mechanism according to an embodiment.

FIG. 1 is a view showing the structure on the periphery of the piston in the clutch mechanism 1 according to this embodiment.

The clutch mechanism 1 according to this embodiment is a wet multiple disc clutch in which a plurality of discs 7 and a plurality of plates 8 are alternately arranged adjacent to each other, and is applied to, for example, a differential device configured to control torque distribution to wheels in a four-wheel drive vehicle. The differential device controls connection/disconnection of the clutch in the clutch mechanism in accordance with the traveling state of the vehicle, thereby controlling the torque distribution to transmit an appropriate torque to the drive shaft of each wheel.

The clutch mechanism 1 includes, in a case 2, an input shaft 3, an output shaft 4, a disc holder 5, a plate holder 6, the discs 7, the plates 8, the piston 9, a piston chamber 10, an oil passage 11, and a solenoid valve 12. The discs 7 and the plates 8 are the frictional engagement elements of the wet multiple disc clutch or the like.

The input shaft 3 and the output shaft 4 are arranged in series in an axial direction L and rotatably supported in the case 2. The input shaft 3 rotates by receiving a driving force from a driving source (not shown) such as an engine or a motor. The disc holder (clutch hub) 5 is spline-connected to the input shaft 3 and rotates integrally with the input shaft 3. The plate holder (clutch drum) 6 is spline-connected to the output shaft 4 and rotates integrally with the output shaft 4. The disc holder 5 holds the plurality of discs 7 arranged at a predetermined interval in the axial direction L of the input shaft 3 and the output shaft 4. The plate holder 6 holds the plurality of plates 8 arranged at a predetermined interval in the axial direction L of the input shaft 3 and the output shaft 4. The discs 7 and the plates 8 are arranged in the axial direction L so as to alternately face each other. The disc holder 5 and the plate holder 6 are supported by a plurality of bearings 13 so as to be rotatable relatively.

The piston 9 is a hollow disc-shaped member and is supported in the case 2 so as to be displaceable in the axial direction L. The piston 9 is arranged close to a plate 8a located on the outermost side in the plurality of plates 8 held by the plate holder 6. The piston 9 is biased in a direction to separate from the plates 8 by a return spring 14 and supported in the case 2 in this state. In the piston 9, a plate pressing portion 91 that contacts and presses the plate 8a on the outermost side is provided on one side surface (plate side) in the axial direction L, and an oil flow portion 92 that forms part of the piston chamber 10 to which the oil pressure of oil serving as hydraulic oil is applied is provided on the other side surface (solenoid valve side). The oil flow portion 92 has an uneven (concavo-convex) shape in the circumferential direction and has a function of changing the flow velocity of the oil, as will be described later.

The piston chamber 10 is formed by the side surface of the piston 9 on which the oil flow portion 92 is formed, and a side wall 2a of the case 2. An upstream-side oil channel 11a communicating with the piston chamber 10 is formed in the side wall 2a of the case 2. The upstream-side oil channel 11a communicates with the solenoid valve 12. In addition, a downstream-side oil channel 11b communicating with the upstream-side oil channel 11a and the solenoid valve 12 is formed in the case 2. The downstream-side oil channel 11b extends up to the vicinity of a bearing 15 that supports the output shaft 4. That is, the oil in the piston chamber 10 flows out to the vicinity of the bearing 15 of the output shaft 4 via the upstream-side oil channel 11a, the solenoid valve 12, and the downstream-side oil channel 11b.

The solenoid valve 12 controls the flow rate of the oil that flows from the upstream-side oil channel 11a to the downstream-side oil channel 11b. The solenoid valve 12 increases/decreases the flow rate of the flowing oil or cuts the flow by changing the opening diameter of the valve. The oil pressure of the oil in the piston chamber 10 is thus increased/decreased to operate the piston 9. If the oil pressure in the piston chamber 10 exceeds a first oil pressure, the piston 9 is operated by the oil pressure against the force of the return spring 14 and contacts and presses the plate 8a on the outermost side. Then, the plates 8 sandwich the discs 7, and a state in which the discs 7 and the plates 8 engage with each other is obtained. Since the plates 8 and the discs 7 can integrally rotate in this state, an engaging state in which the torque can be transmitted from the input shaft 3 to the output shaft 4 occurs. On the other hand, if the oil pressure in the piston chamber 10 falls below the first oil pressure, the pressing force of the oil pressure to the piston 9 decreases. The piston 9 is operated by the force of the return spring 14 and separates from the plate 8a on the outermost side. Then, since the state in which the discs 7 and the plates 8 engage with each other is released, and the plates 8 and the discs 7 can rotate relatively, a disengaged state in which the torque is not transmitted from the input shaft 3 to the output shaft 4 occurs.

The structure and function of the clutch mechanism 1 have been described above.

Structure of Piston 9

The structure of the piston 9 in the clutch mechanism 1 according to this embodiment will be described next with reference to FIGS. 2A to 2C and FIGS. 3A and 3B in addition to FIG. 1.

FIGS. 2A and 2B are views showing the outer appearance of the piston 9 in the clutch mechanism 1 according to this embodiment. FIG. 2C is a view showing the outer appearance of a conventional piston.

As described above, the piston 9 according to this embodiment has a hollow disc shape. The plate pressing portion 91 that contacts and presses the plate 8a on the outermost side is provided on a first side surface portion 9A on one side in the axial direction L, and the oil flow portion 92 that forms part of the piston chamber 10 to which the oil pressure is applied is provided on a second side surface portion 9B on the other side. The oil flow portion 92 has an uneven shape in the circumferential direction. More specifically, as shown in FIGS. 2A and 2B, the oil flow portion 92 includes a plurality of concave portions 93 arranged at a predetermined interval (an interval of 45° in FIGS. 2A and 2B) and extending in the circumferential direction, and a plurality of convex portions 94 provided between the adjacent concave portions 93. Each concave portion 93 has a length about five times larger than the convex portion 94, and the concave portions 93 and the convex portions 94 are alternately arranged.

Each concave portion 93 includes a bottom surface portion 93a, an inner side surface 93b, an outer side surface 93c, a front side surface 93d, and a rear side surface 93e. Each convex portion 94 includes an upper surface portion 94a, a front side surface 94b, and a rear side surface 94c. The front side surface 93d of the concave portion 93 forms the rear side surface 94c of the convex portion 94, and the rear side surface 93e of the concave portion 93 forms the front side surface 94b of the convex portion 94. Each of the front side surfaces 93d and 94b and the rear side surfaces 93e and 94c of the concave portion 93 and the convex portions 94 has a curved shape tilting while widening from the upper surface portion 94a of the convex portion 94 to the bottom surface portion 93a of the concave portion 93. The bottom surface portions 93a of the concave portions 93 have the same height in the circumferential direction. Similarly, the upper surface portions 94a of the convex portions 94 have the same height in the circumferential direction.

The first side surface portion 9A has convex portions 95 and concave portions 96 which are inverted with respect to the oil flow portion 92 (concave portions 93 and convex portions 94) of the second side surface portion 9B. This structure can reduce the weight of the piston 9 and improve the hydraulic responsiveness. In addition, the plate pressing portion 91 includes a plurality of projecting portions 91a rising from outer side surfaces 95a of the convex portions 95 of the first side surface portion 9A corresponding to the outer side surfaces 93c of the concave portions 93 of the oil flow portion 92. The projecting portions 91a extend in the circumferential direction at predetermined intervals (each interval is even of 45° in FIGS. 2A and 2B). In the piston 9, each projecting portion 91a contacts the plate 8a on the outermost side in the circumferential direction and presses the plates 8 via a bearing (not shown) in the thrust direction.

In FIG. 2C that shows the structure of a conventional piston in comparison with the structure of the piston 9 according to this embodiment, an oil flow portion 92' on a side surface portion 9B of a piston 9' has not an uneven shape but an evenly smooth surface in the circumferential direction. For this reason, the flow velocity of oil flowing along the oil flow portion 92' is constant and does not change. On the other hand, since the oil flow portion 92 of the piston 9 according to this embodiment has the uneven shape in the circumferential direction, the flow velocity of the oil changes.

The function of the piston 9 according to this embodiment to change the flow velocity of the oil will be described below with reference to FIGS. 3A and 3B.

Figure 3A:
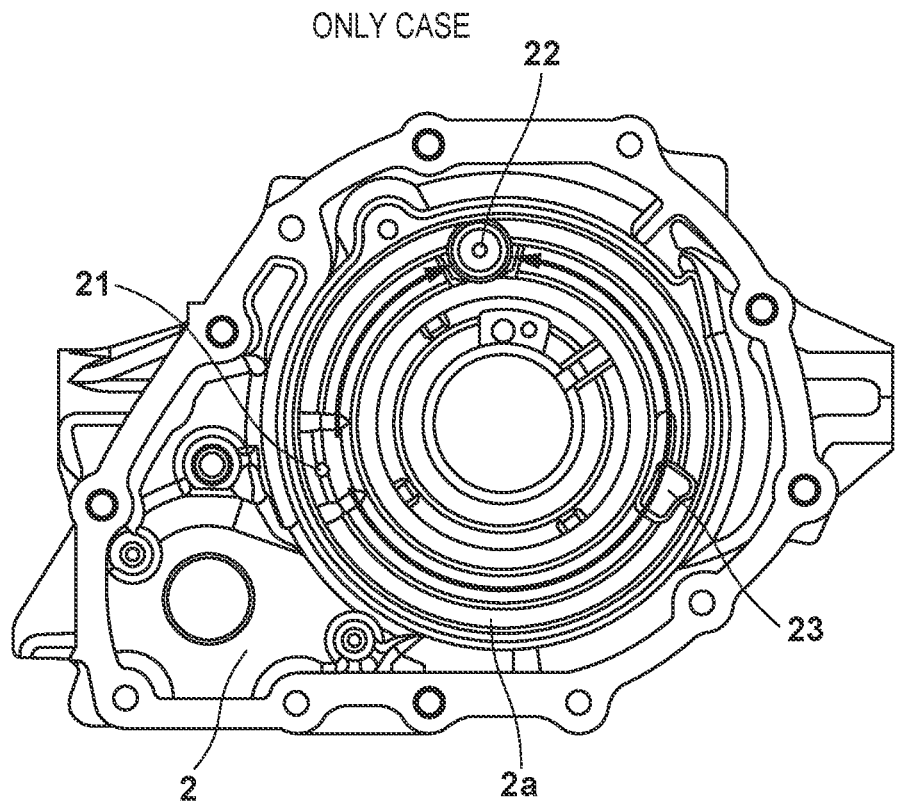
FIG. 3A is a side view showing the structure of a piston chamber in the clutch mechanism according to the embodiment.
Figure 3B:
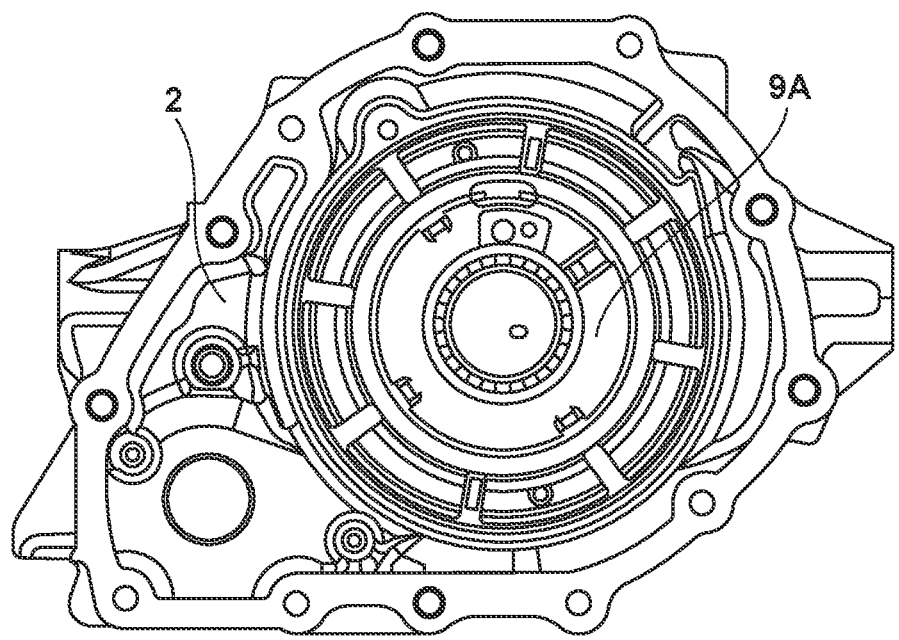
FIG. 3B is a side view showing a state in which the piston is assembled in the piston chamber in the clutch mechanism according to the embodiment.

FIG. 3A is a side view showing the structure of the piston chamber 10 in the clutch mechanism 1 according to this embodiment. FIG. 3B is a side view showing a state in which the piston 9 is assembled in the piston chamber 10 in the clutch mechanism 1 according to this embodiment.

The side wall 2a of the case 2 in the piston chamber 10 is provided with an oil inlet 21, an oil outlet 22, and an oil pressure detection port 23. The oil inlet 21, the oil outlet 22, and the oil pressure detection port 23 each have a shape recessed as compared to the other portions and are arranged at a predetermined interval (an interval of 120° in FIGS. 3A and 3B). Since the uneven shape is provided on the side wall 2a of the case 2 forming the piston chamber 10 as well, an uneven oil channel is formed by the piston 9 and the side wall 2a, and bubbles hardly stay. To the oil inlet 21, the oil is always supplied at a predetermined flow rate from an oil pump (not shown). The oil that flows from the oil inlet 21 into the piston chamber 10 flows counterclockwise or clockwise in the piston chamber 10 and is discharged from the oil outlet 22. A sensor (not shown) configured to detect the pressure of the oil flowing in the piston chamber 10 is arranged in the oil pressure detection port 23. When the piston 9 is arranged such that, as shown in FIG. 3B, the oil flow portion 92 faces the side wall 2a of the case 2 shown in FIG. 3A, the piston chamber 10 is formed inside. At this time, the piston 9 is assembled to the case 2 while adjusting the phases to locate the oil inlet 21, the oil outlet 22, and the oil pressure detection port 23 in the concave portions 93 of the piston 9, in other words, not to locate the convex portions 94 of the piston 9 near the oil inlet 21, the oil outlet 22, and the oil pressure detection port 23.

In a case in which bubbles are mixed in the oil flowing in the piston chamber 10, if the flow velocity of the oil is constant and does not change, the bubbles readily stay in the oil inlet 21, the oil outlet 22, and the oil pressure detection port 23. However, since the oil flow portion 92 of the piston 9 according to this embodiment has the uneven shape, the capacity (volume) of the piston chamber 10 increases, and the oil channel in the piston chamber 10 obtains an uneven shape. As a result, the uneven shape functions as a partition wall that blocks the flow of the oil. Additionally, by the effect of the increase in the capacity of the piston chamber 10, the flow velocity of the oil lowers, the bubbles are readily removed from the partition wall due to the buoyant force of the oil, and the stay hardly occurs. Note that to prevent the bubbles from hitting the partition wall and staying, the piston 9 is configured to locate the oil inlet 21, the oil outlet 22, and the oil pressure detection port 23 in the concave portions 93 of the piston 9 and not to locate the convex portions 94 of the piston 9 near the oil inlet 21, the oil outlet 22, and the oil pressure detection port 23.

In addition, when the oil flow portion 92 of the piston 9 according to this embodiment has the uneven shape, the strength of the piston 9 can be increased.

The above-described embodiment is an example of a means for implementing the present invention, and the present invention is applicable to an arrangement obtained by correcting or modifying the embodiment without departing from the scope of the present invention. For example, the piston 9 according to the embodiment is applicable not only to the clutch mechanism of a differential device but also to a mechanism configured to switch a plurality of electric motors in a hybrid vehicle.

SUMMARY OF EMBODIMENT

First Aspect

There is provided a clutch mechanism 1 configured to switch a clutch 7 or 8 to one of an engaging state and a released state by a piston 9 operated by an oil pressure, wherein the piston 9 includes a first side surface portion 9A configured to press the clutch 7 or 8, and a second side surface portion 9B on which the oil pressure acts, and the second side surface portion 9B has an uneven shape in a circumferential direction.

According to the first aspect, since the side surface portion 9B of the piston 9 on which the oil pressure acts has the uneven shape, the capacity of the piston chamber 10 on which the oil pressure acts increases, and since the oil channel obtains an uneven shape, the flow velocity of oil changes. Accordingly, the uneven shape of the piston 9 functions as a partition wall that blocks the flow of the oil. Additionally, by the effect of the increase in the capacity of the piston chamber 10, the flow velocity of the oil lowers, bubbles are readily removed from the partition wall due to the buoyant force of the oil, and a stay hardly occurs.

In addition, when the piston 9 has the uneven shape, the strength of the piston 9 can be increased.

Second Aspect

In the first aspect, the piston 9 has a hollow disc-like outer shape, and the second side surface portion includes a plurality of concave portions 93 arranged at a predetermined interval and extending in the circumferential direction, and a plurality of convex portions 94 provided between adjacent concave portions.

According to the second aspect, it is possible to impart a function of changing the flow velocity of the oil to the piston 9.

Third Aspect

In the second aspect, the concave portion 93 is longer than the convex portion 94, and the concave portions 93 and the convex portions 94 are alternately arranged.

According to the third aspect, by the effect of the increase in the capacity of the piston chamber 10, the flow velocity of the oil lowers, bubbles are readily removed from the partition wall due to the buoyant force of the oil, and a stay hardly occurs.

Fourth Aspect

In the second or third aspect, the first side surface portion 9A has a structure in which the concave portions 93 and the convex portions 94 are inverted as compared to the second side surface portion 9B, and includes a plurality of projecting portions 91a rising from the convex portions corresponding to the concave portions 93 of the second side surface portion 9B, and the projecting portions 91a press the clutch 8a.

According to the fourth aspect, it is possible to reduce the weight of the piston 9 and improve the hydraulic responsiveness.

Fifth Aspect

In any one of the first to fourth aspects, the second side surface portion 9B forms part of a piston chamber 10 configured to flow oil between the second side surface portion and a case 2 in which the piston 9 is arranged, a side wall 2a of the case 2 in the piston chamber 10 is provided with an oil inlet 21, an oil outlet 22, and an oil pressure detection port 23, and the oil inlet 21, the oil outlet 22, and the oil pressure detection port 23 each have a shape recessed as compared to other portions in the side wall 2a of the case 2 and are arranged at a predetermined interval.

According to the fifth aspect, since the uneven shape is provided on the side wall 2a of the case 2 forming the piston chamber 10 as well, it is possible to implement a structure in which an uneven oil channel is formed by the piston 9 and the side wall 2a, and bubbles hardly stay.

Sixth Aspect

In the fifth aspect, the oil is always supplied at a predetermined flow rate to the oil inlet 21, the oil that flows from the oil inlet 21 into the piston chamber 10 flows in the piston chamber 10 and is discharged from the oil outlet 22, and a sensor configured to detect the pressure of the oil flowing in the piston chamber 10 is arranged in the oil pressure detection port 23.

According to the sixth aspect, it is possible to implement a structure in which bubbles hardly stay in a channel from the oil inlet 21 to the oil outlet 22 via the oil pressure detection port 23.

Seventh Aspect

In the sixth aspect, the piston 9 is assembled to the case 2 to locate the oil inlet 21, the oil outlet 22, and the oil pressure detection port 23 in concave portions 93 of the piston 9.

According to the seventh aspect, it is possible to implement a structure in which the piston 9 are arranged not to locate the convex portions 94 of the piston 9 near the oil inlet 21, the oil outlet 22, and the oil pressure detection port 23, thereby preventing bubbles from hitting the partition wall and staying.

Eighth Aspect

There is provided a piston 9 operated by an oil pressure and configured to switch a clutch 7 or 8 of a clutch mechanism 1 to one of an engaging state and a released state,
wherein the piston 9 includes a first side surface portion 9A configured to press the clutch 8a, and a second side surface portion 9B on which the oil pressure acts, and
the second side surface portion 9B has an uneven shape in a circumferential direction.

According to the eighth aspect, since the side surface portion 9B of the piston 9 on which the oil pressure acts has the uneven shape, the capacity of the piston chamber 10 on which the oil pressure acts increases, and since the oil channel obtains an uneven shape, the flow velocity of oil changes. Accordingly, the uneven shape of the piston 9 functions as a partition wall that blocks the flow of the oil. Additionally, by the effect of the increase in the capacity of the piston chamber 10, the flow velocity of the oil lowers, bubbles are readily removed from the partition wall due to the buoyant force of the oil, and a stay hardly occurs.

In addition, when the piston 9 has the uneven shape, the strength of the piston 9 can be increased.

Ninth Aspect

In the eighth aspect, the second side surface portion 9B includes a plurality of concave portions 93 arranged at a predetermined interval and extending in the circumferential direction, and a plurality of convex portions 94 provided between adjacent concave portions.

According to the ninth aspect, it is possible to impart a function of changing the flow velocity of the oil to the piston 9.

Tenth Aspect

In the ninth aspect, the concave portion 93 is longer than the convex portion 94, and the concave portions 93 and the convex portions 94 are alternately arranged.

According to the tenth aspect, by the effect of the increase in the capacity of the piston chamber 10, the flow velocity of the oil lowers, bubbles are readily removed from the partition wall due to the buoyant force of the oil, and a stay hardly occurs.

Eleventh Aspect

In the ninth or tenth aspect, the first side surface portion 9A has a structure in which the concave portions 93 and the convex portions 94 are inverted as compared to the second side surface portion 9B, and includes a plurality of projecting portions 91a rising from the convex portions corresponding to the concave portions 93 of the second side surface portion 9B, and the projecting portions 91a press the clutch 8a.

According to the eleventh aspect, it is possible to reduce the weight of the piston 9 and improve the hydraulic responsiveness.

What is claimed is:

1. A clutch mechanism configured to switch a clutch to one of an engaging state and a released state by a piston operated by an oil pressure,
wherein the piston includes a first side surface portion configured to press the clutch, and a second side surface portion on which the oil pressure acts, and
the second side surface portion has a plurality of concave portions and convex portions that form an uneven shape in a circumferential direction,
the concave portions of the second side surface portion are groove shaped portions formed entirely in the circumferential direction and arranged at predetermined intervals, and the convex portions of the second side surface portion are partition walls of each groove shaped concave portion of the second side surface portion, each groove shaped concave portion has a predetermined length in the circumferential direction,
the second side surface portion constitutes a part of a piston chamber that causes oil to flow between the piston and a case in which the piston is arranged, and
the first side surface portion has a plurality of convex portions and concave portions which are inverted with respect to the concave portions and the convex portions of the second side surface portion, and includes a plurality of projecting portions rising from the convex portions of the first side surface portions corresponding to the concave portions of the second side surface portion, and the projecting portions press the clutch.

2. The mechanism according to claim 1, wherein the piston is disc-shaped.

3. The mechanism according to claim 1, wherein the concave portion of the second side surface portion is longer than the convex portion of the second side surface portion, and the concave portions and the convex portions of the second side surface portion are alternately arranged.

4. The mechanism according to claim 1, wherein
a side wall of the case in the piston chamber is provided with an oil inlet, an oil outlet, and an oil pressure detection port, and
the oil inlet, the oil outlet, and the oil pressure detection port each have a shape recessed as compared to other portions in the side wall of the case and are arranged at predetermined intervals.

5. The mechanism according to claim 4, wherein oil is always supplied at a predetermined flow rate to the oil inlet when the clutch mechanism is in operation, the oil that flows from the oil inlet into the piston chamber flows in the piston chamber and is discharged from the oil outlet, and a sensor configured to detect the pressure of the oil flowing in the piston chamber is arranged in the oil pressure detection port.

6. The mechanism according to claim 5, wherein in a state that the piston is assembled to the case, the oil inlet, the oil outlet, and the oil pressure detection port of the case face the concave portions of the second side surface portion.

7. A piston operated by an oil pressure and configured to switch a clutch of a clutch mechanism to one of an engaging state and a released state, wherein
the piston includes a first side surface portion configured to press the clutch, and a second side surface portion on which the oil pressure acts, and
the second side surface portion has a plurality of concave portions and convex portions that form an uneven shape in a circumferential direction,
the concave portions of the second side surface portion are groove shaped portions formed entirely in the circumferential direction and arranged at predetermined intervals, and the convex portions of the second side surface portion are partition walls of each groove shaped concave portion of the second side surface portion, each groove shaped concave portion has a predetermined length in the circumferential direction, the second side surface portion constitutes a part of a piston chamber that causes oil to flow between the piston and a case in which the piston is arranged, and the first side surface portion has a plurality of convex portions and concave portions which are inverted with respect to the concave portions and the convex portions of the second side surface portion, and includes a plurality of projecting portions rising from the convex portions of the first side surface portions corresponding to the concave portions of the second side surface portion, and the projecting portions press the clutch.

8. The piston according to claim 7, wherein the concave portion of the second side surface portion is longer than the convex portion of the second side surface portion, and the concave portions and the convex portions of the second side surface portion are alternately arranged.

* * * * *